(12) United States Patent
Fischer et al.

(10) Patent No.: US 12,326,976 B2
(45) Date of Patent: Jun. 10, 2025

(54) METHOD FOR DETERMINING AN EYE DISTANCE IN A PAIR OF DATA GLASSES, AND DATA GLASSES

(71) Applicant: Robert Bosch GmbH, Stuttgart (DE)

(72) Inventors: Johannes Fischer, Pliezhausen (DE); Soeren Sofke, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/693,625

(22) PCT Filed: Jan. 25, 2023

(86) PCT No.: PCT/EP2023/051754
§ 371 (c)(1),
(2) Date: Mar. 20, 2024

(87) PCT Pub. No.: WO2023/174605
PCT Pub. Date: Sep. 21, 2023

(65) Prior Publication Data
US 2025/0147582 A1  May 8, 2025

(30) Foreign Application Priority Data
Mar. 17, 2022  (DE) .................... 10 2022 202 622.5

(51) Int. Cl.
*G06F 3/01* (2006.01)
*G02B 27/01* (2006.01)

(52) U.S. Cl.
CPC .......... *G06F 3/013* (2013.01); *G02B 27/017* (2013.01); *G02B 27/0179* (2013.01); *G02B 2027/0178* (2013.01); *G02B 2027/0187* (2013.01)

(58) Field of Classification Search
CPC ... G06F 3/013; G02B 27/017; G02B 27/0179; G02B 2027/0178; G02B 2027/0187
See application file for complete search history.

(56) References Cited

U.S. PATENT DOCUMENTS

| | | | |
|---|---|---|---|
| 7,522,344 B1 | 4/2009 | Curatu et al. | |
| 10,598,928 B1* | 3/2020 | Lam | G06F 3/013 |
| 10,845,594 B1* | 11/2020 | Lam | G02B 6/0053 |
| 11,829,528 B2* | 11/2023 | Berkner-Cieslicki | G02B 27/0093 |

(Continued)

OTHER PUBLICATIONS

International Search Report for PCT/EP2023/051754, Issued Mar. 31, 2023.

*Primary Examiner* — Dmitriy Bolotin
(74) *Attorney, Agent, or Firm* — NORTON ROSE FULBRIGHT US LLP

(57) ABSTRACT

A method at least for determining an eye distance between a user's eye and an optical element of an optical system of a pair of data glasses including a virtual retina display. The method includes: generating a scanned laser beam; optically reproducing the scanned laser beam; illuminating a user's eye by means of the optically reproduced scanned laser beam; detecting a reflection signal reflected by the user's eye; ascertaining pupil positions within the detected reflection signal; determining relative distances of the pupil positions, ascertained from the reflection signal, to one another and/or to a common origin point and/or to one or more reference points; and calculating an instantaneous eye distance from the determined relative distances.

12 Claims, 3 Drawing Sheets

(56) References Cited

U.S. PATENT DOCUMENTS

| | | | |
|---|---|---|---|
| 2010/0060551 A1* | 3/2010 | Sugiyama | G02B 26/06 353/31 |
| 2013/0016413 A1* | 1/2013 | Saeedi | G02B 27/01 359/205.1 |
| 2015/0035744 A1 | 2/2015 | Robbins et al. | |
| 2018/0157909 A1* | 6/2018 | Ollila | G06V 40/19 |
| 2018/0157910 A1* | 6/2018 | Ollila | G06V 40/193 |
| 2018/0246336 A1 | 8/2018 | Greenberg | |
| 2018/0275409 A1* | 9/2018 | Gao | G02B 27/0172 |
| 2019/0208190 A1 | 7/2019 | Crisler et al. | |
| 2020/0186787 A1 | 6/2020 | Cantero Clares | |
| 2020/0241636 A1 | 7/2020 | Lu et al. | |
| 2021/0041948 A1* | 2/2021 | Berkner-Cieslicki | G06F 3/011 |
| 2021/0141231 A1 | 5/2021 | Yeh et al. | |
| 2024/0160024 A1* | 5/2024 | Choi | G09G 3/003 |
| 2025/0004171 A1* | 1/2025 | Masuda | G02B 3/00 |

\* cited by examiner

METHOD FOR DETERMINING AN EYE DISTANCE IN A PAIR OF DATA GLASSES, AND DATA GLASSES

BACKGROUND INFORMATION

Many conventional data glasses work with a constant eye distance and therefore require relatively fixed connections to their users, e.g., via straps or the like.

SUMMARY

Provided according to an example embodiment of the present invention is a method at least for determining, in particular dynamically, an, in particular changing, eye distance between a user's eye and an optical element of an optical system, in particular an optimal eye distance (eye relief), of a pair of data glasses comprising a virtual retinal display (VRD), having at least the following method steps: a) generating a scanned laser beam; b) optically reproducing the scanned laser beam; c) illuminating the user's eye by means of the optically reproduced scanned laser beam; d) detecting a reflection signal reflected by the user's eye; e) ascertaining pupil positions within the detected reflection signal; f) determining relative distances of the pupil positions, ascertained from the reflection signal, to one another and/or to a common origin point and/or to one or more reference points; and g) calculating an instantaneous eye distance from the determined relative distances. A high wearing comfort for the user of the data glasses can thereby advantageously be achieved, in particular by dispensing with a firm fixing of the data glasses and/or by ensuring a high display quality and/or reliability even if the data glasses are slipping. An area of suitable fields of application for data glasses can advantageously be increased. Advantageously, a high suitability for daily use of data glasses can be achieved. An "eye distance" is in particular to be understood as a relative position of the user's eye in an optical system to an optical element and a last optical element arranged in front of the user's eye, of the optical system. Preferably, the term "eye distance" is to be understood as a distance between the user's eye and the last optical element of the optical system that is arranged in front of the user's eye, in particular the eyeglass lens of the data glasses. Preferably, the optimal eye distance (also referred to as eye relief) is determined in the method. In particular, the optimal eye distance corresponds to the position of the user's eye in the optical system, in particular the distance between the user's eye and the last optical element of the optical system that is arranged in front of the user's eye, at which distance the user can clearly see an entire visual field, in particular free of vignetting or trimming. In particular, at the distance corresponding to the optimal eye distance, a size of an exit pupil of the optical system approximately matches a size of a pupil of the user's eye or is slightly smaller than the size of the pupil. In particular, at the optimal eye distance (eye relief), the entire exit pupil/entire image of the virtual retinal display enters the user's eye. In the case of a pair of binoculars or a telescope, the eye relief refers, for example, to the optimal distance between eye lenses of an eyepiece of the pair of binoculars or of the telescope and the pupil of the user's eye. In particular, the method comprises a method part in which a dynamic correction of the eye relief of the optical system, in particular of the optimal eye distance of the optical system, is carried out on the basis of ascertained eye distance changes. In this method part, the optimal eye distance of the optical system and/or a focal point of the exit pupil of the optical system is in particular adapted to an actual ascertained distance between the user's eye and the eyeglass lens of the data glasses, preferably by a manipulation of the optical system.

A pair of "data glasses" is in particular to be understood as a wearable (head-mounted display) by means of which information can be added to the visual field of a user. Data glasses preferably allow for augmented reality and/or mixed reality applications. Data glasses are also commonly referred to as smart glasses. In particular, according to an example embodiment of the present invention, the pair of data glasses has a virtual retinal display (VRD), also called a retinal scanning display (RSD). In particular, the virtual retinal display comprises at least one (scanned) laser projector. In particular, the laser projector is provided to output the scanned laser beam for generating the image display, in particular the virtual retinal display. In particular, the laser beam output by the laser projector can have a further signal component which is invisible to a human eye and/or which is provided for tasks other than the image display. For example, this further signal component of the scanned laser beam can be designed as an infrared laser signal. In particular, the scanned laser beam comprises an infrared beam component. "Provided" is in particular to be understood as specifically programmed, designed, and/or equipped. The fact that an object is provided for a specific function is to be understood in particular to mean that the object fulfills and/or executes this specific function in at least one application and/or operating state.

An "optical reproduction" is in particular to be understood as a reproduction using optical elements and/or functions, such as lenses, mirrors, diffractors, etc. In particular, the optical reproduction of an image is different from a digital reproduction of an image and a subsequent output of the thus reproduced image by the laser projector. In particular, when illuminating the user's eye, the scanned laser beam enters the user's eye and illuminates at least a retina of the user's eye. In particular, the retina interacts in an at least partially reflective manner with the scanned laser beam, in particular at least with the infrared beam component of the scanned laser beam. In particular, the reflection signal comprises a number of individual reflection images which corresponds to the number of splits of the laser beam. In particular, the pupil positions changing depending on the eye distance can be referenced to a common (fixed) reference point, e.g., in the case of four images to the point at which the four images intersect, to respectively different (fixed) reference points, e.g., an edge of a respective image, or to (non-fixed) reference points, e.g., the pupil positions in other images.

It is furthermore provided according to an example embodiment of the present invention that, by means of the optical reproduction of the scanned laser beam, at least two, preferably at least four, image copies shifted relative to one another in an image plane, in particular in a pupil plane of the user's eye, are generated. As a result, simple monitoring of changes in the system consisting of data glasses and user can advantageously be made possible. Simple determination of the relative distances can advantageously be made possible. Simple distinction between the individual images generated by reproduction can advantageously be achieved. An evaluation and/or calculation for determining the eye distance can advantageously be facilitated. In particular, the image copies are shifted relative to one another but nevertheless partially overlapping. In particular, there is a region in the image plane in which all four image copies partially overlap. Alternatively, however, the image copies can also be without overlap with one another. In particular, by means of shifted image copies, it is achieved that the pupil is situated at a different image coordinate at any time in each image copy/in each reflection image.

In addition, according to an example embodiment of the present invention, it is provided that the eye distance between the user's eye, in particular a pupil position of the user's eye, and a last optical element, in particular as seen along the beam path of the scanned laser beams, of the optical system, traversed by the scanned laser beam, of the data glasses, preferably the eyeglass lens of the data glasses, is determined. A particularly good eye position determination can thereby advantageously be made possible, whereby a particularly effective and precise correction can in particular be carried out. In particular, a distance between the optical element generating the optical reproduction, e.g., a segmentation lens, and the user's eye is measured in the method, wherein the optical element generating the optical reproduction often represents a penultimate optical component of the optical system, in particular as seen along the beam path of the scanned laser beams. In general, however, the distance between the last optical component and the penultimate optical component of the optical system can be assumed to be constant (exception: strong bending, tensile and/or compression stress of the data glasses) so that the eye distance can simply be determined from this actually measured distance. In particular, the last optical element of the optical system is embedded in an eyeglass lens of the data glasses. In particular, the last optical element of the optical system is designed as a diffractive optical component (DOE) or as a holographic optical component (HOE). An "optical system" is in particular to be understood as an arrangement of a plurality of optical components, in particular with various optical functions, which is designed in such a way that it can be traversed by a single light beam and/or that each of the optical elements of the optical system manipulates the same individual light beam (between emission and detection/absorption) at least once, preferably at least twice.

Furthermore, according to an example embodiment of the present invention, it is provided that the scanned laser beam is reproduced by a segmentation lens. A simple and/or cost-effective design can thereby advantageously be achieved. Advantageously, the segmentation lens can be bidirectionally traversed by the laser beam. In particular, the segmentation lens comprises at least two, preferably four, individual segments which each generate one of the image copies in the image plane. In particular, the segmentation lens forms a part of the optical system of the data glasses. In particular, the segmentation lens is arranged in the optical system of the data glasses between the laser projector and the eyeglass lens. In principle, identically acting alternatives to the segmentation lens, such as suitable beam splitting arrangements, etc., are also possible.

It is furthermore provided according to an example embodiment of the present invention that the pupil positions are ascertained from the reflection signal by using the bright-pupil effect. This advantageously can make it possible to reliably and/or simply ascertain the pupil position and thus also the eye distance. The bright-pupil effect advantageously generates a strong iris/pupil contrast, and thus allows robust eye tracking in all iris pigmentations, which is thereby in particular substantially uninfluenced by interferences due to eyelashes and other coverings. The bright-pupil effect is in particular brought about by the phenomenon that the retina reflects an increased proportion of incident light if the wavelength thereof is in the (infrared) range of about 850 nm.

According to an example embodiment of the present invention, it is also provided that the calculation of the eye distance takes place recurrently, at least during operation of the data glasses, in particular periodically, preferably at frequencies of more than 1 Hz. A dynamic of the eye distance determination and/or of an eye distance monitoring can thereby advantageously be obtained. Advantageously, an active readjustment and/or an active correction of the exit pupil position, in particular of the eye relief, can be achieved.

In addition, according to an example embodiment of the present invention, it is provided that, in particular in the method part in which the dynamic correction of the eye relief of the optical system, in particular of the optimal eye distance of the optical system, is carried out on the basis of the ascertained eye distance changes, an output of the virtual retinal display, in particular at least one focus of at least one visible portion of the scanned laser beam, is adjusted and/or optimized, in particular dynamically, on the basis of the calculated eye distance. A high wearing comfort for the user of the data glasses can thereby advantageously be achieved, in particular by dispensing with a firm fixing of the data glasses and/or by ensuring a high display quality and/or reliability even if the data glasses are slipping. In particular, a beam path of the scanned laser beam is dynamically adaptively adjusted for adjusting and/or optimizing the output of the VRD. In addition, it is possible that downstream systems of the data glasses and/or downstream systems external to the data glasses are notified of any slipping (a change in the eye distance). In particular, the optical system comprises dynamically controllable components for changing a focus of the visible portion of the scanned laser beam, in particular for changing a focal distance between the focus of the visible portion of the scanned laser beam and the eyeglass lens of the data glasses. For this purpose, the optical system can, for example, comprise lenses or lens systems that can be dynamically controlled, preferably dynamically moved and/or pivoted.

If the detection of the reflected images takes place independently at least of a camera designed to be separate from a laser projector of the virtual retinal display, a high compactness for data glasses can advantageously be realized. In particular, the laser projector also comprises a detector. In particular, the detector is designed to be integrated into the laser projector. In particular, the detector is arranged on-axis with the laser beam emitted by the laser projector. In particular, the laser projector and the detector are combined in a VCESL (vertical-cavity surface-emitting laser) with integrated photodiode (ViP).

According to an example embodiment of the present invention, also provided is the optical system for carrying out the method according to the embodiments of the present invention described above, having the laser projector for generating the scanned laser beam, an optical reproduction element, in particular the segmentation lens, for reproducing the scanned laser beam, and the detector for detecting the reflection signal of the scanned and reproduced laser beam. Advantageously, a particularly high wearing comfort can be achieved for the user of data glasses comprising the optical system.

Provided according to an example embodiment of the present invention is also a pair of data glasses comprising the optical system, and comprising an evaluation unit for evaluating the reflection signal detected by the detector, and comprising an eye distance compensation unit for dynamically controlling components of the data glasses, in particular the optical system of the data glasses, such as the dynamically controllable lenses or the dynamically controllable lens system, with the aim of compensating for influences of eye distance variations on a user perception. Advantageously, a particularly high wearing comfort can be achieved for the user of data glasses comprising the optical system. An "evaluation unit" is in particular to be understood as a unit with at least one electronic evaluation system. An "electronic evaluation system" is in particular to be understood as a unit with a processor and with a memory, and with an operating program stored in the memory. An "eye distance compensation unit" is in particular to be understood as a unit with at least one electronic control system. An "electronic control unit" is in particular to be understood as a unit with a processor and with a memory, and with an operating program stored in the memory. In particular, the eye distance compensation unit and the evaluation unit can be combined in a common computer system. In particular, the eye distance compensation unit generates control signals for compensating for the influences of eye distance variations on a user perception on the basis of signals/evaluations of detector signals received by the evaluation unit. In particular, the eye distance compensation unit and/or the evaluation unit can each be integrated completely or at least partially into the data glasses or can be outsourced at least partially to a cloud or the like or to an external user device that can be connected to the data glasses, such as a smartphone or the like.

The method according to the present invention, the optical system according to the present invention, and the data glasses according to the present invention are not to be limited to the application and embodiment described above. In order to fulfill a functionality described herein, the method according to the present invention, the optical system according to the present invention, and the data glasses according to the present invention can in particular have a number of individual elements, components, units, and method steps that deviates from a number mentioned herein. In addition, in the case of the value ranges specified in this disclosure, values within the mentioned limits are also to be considered as disclosed and usable as desired.

BRIEF DESCRIPTION OF THE DRAWINGS

Further advantages of the present invention result from the following description of the figures. An example embodiment of the present invention is illustrated in the figures. The disclosure herein contain numerous features in combination. A person skilled in the art will expediently also consider the features individually and combine them to form meaningful further combinations.

DETAILED DESCRIPTION OF EXAMPLE EMBODIMENTS

Figure 1:
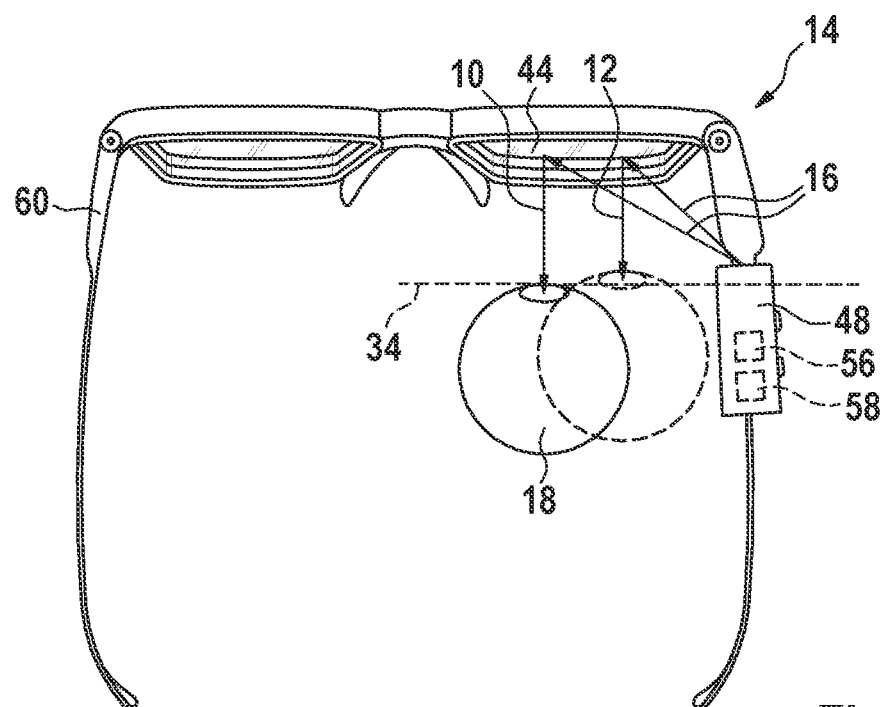
FIG. 1 is a schematic representation of a pair of data glasses comprising an optical system, according to an example embodiment of the present invention.

FIG. 1 is a schematic representation of a pair of data glasses 14. The data glasses 14 have a virtual retinal display. The data glasses 14 comprise an eyeglass frame 60. The data glasses 14 comprise eyeglass lenses 44. The data glasses 14 are provided for dynamically determining eye distances 10, 12, which are in particular changing. The data glasses 14 are provided for dynamically correcting an output of the virtual retinal display when eye distances 10, 12 change. The eye distance 10, 12 is in this case determined between a user's eye 18 and the eyeglass lens 44 of the data glasses 14. FIG. 1 shows, by way of example, two different positions of the user's eye 18, which can, for example, arise by the data glasses 14 slipping on the nose of the user. Without a readjustment, such slipping would mean moving the user's eye 18 away from an eye distance of a static system and thus at least a visual field loss. For the data glasses 14 to be able to provide a suitable exit pupil/a suitable eye relief for both positions, the output of the virtual retinal display is corrected dynamically. As a result of the dynamic correction, the exit pupil/eye relief moves with the user's eye 18, so to speak. The data glasses 14 have an evaluation unit 56. The data glasses 14 have an eye distance compensation unit 58. The data glasses 14 have an optical system 42.

Figure 2:
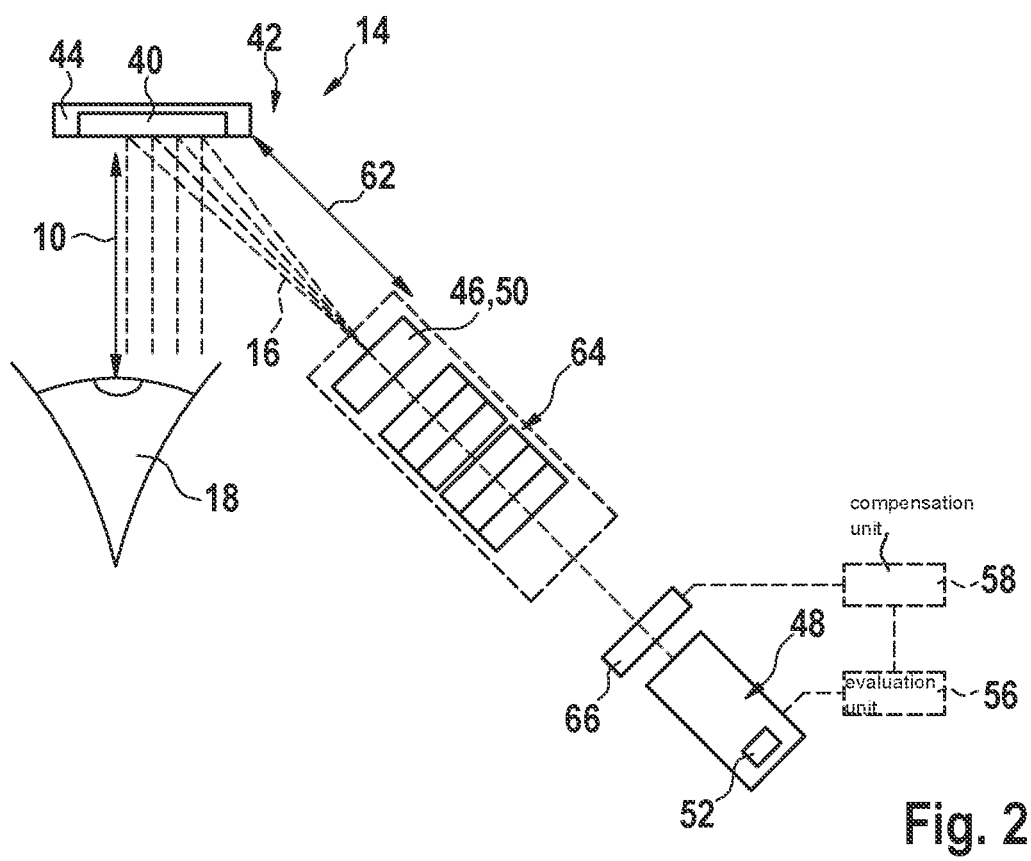
FIG. 2 is a schematic representation of the optical system, according to an example embodiment of the present invention.

FIG. 2 schematically shows at least a portion of the optical system 42. The optical system 42 has a laser projector 48. The laser projector 48 is designed as a scanned laser projector 48. The laser projector 48 is provided to generate and output a scanned laser beam 16. The scanned laser beam 16 generates an image display of the data glasses 14. The scanned laser beam 16 can be provided for ascertaining a pupil position, pupil movement, pupil shape, and/or pupil size. The scanned laser beam 16 comprises a visible portion which is provided for outputting an image to the user's eye 18. The scanned laser beam 16 is provided to output an image display directly onto a retina of the user's eye 18. The scanned laser beam 16 comprises an infrared portion which is provided at least to ascertain a pupil position of the user's eye 18. The laser projector 48 is at least partially integrated into the eyeglass frame 60. The laser projector 48 comprises a MEMS mirror system 64 for scanning the scanned laser beam 16.

The optical system 42 comprises an optical reproduction element 50. The optical reproduction element 50 is passed by the scanned laser beam 16. The optical reproduction element 50 is designed as a segmentation lens 46. The optical reproduction element 50 is provided to reproduce at least the infrared portion of the scanned laser beam 16. The optical reproduction element 50 forms a penultimate optical element of the optical system 42. The evaluation unit 56 is provided to ascertain a distance between the optical reproduction element 50 and the user's eye 18. The optical system 42 is partially formed by the eyeglass lens 44. The eyeglass lens 44 comprises a last optical element 40 of the optical system 42. The last optical element 40 is passed by the scanned laser beam 16. The last optical element 40 is designed as a holographic optical element (HOE). The HOE is provided to reflect and focus an incident scanned laser beam 16 onto the user's eye 18. The last optical element 40 and the penultimate optical element have a fixed distance 62 to one another. As a result of mechanical stresses, this fixed distance 62 can be influenced easily, but such distance changes can be neglected when determining the eye distance 10, 12. By taking into account the fixed distance 62, the evaluation unit 56 is provided to determine the distance between the last optical element 40 and the user's eye 18, i.e., in particular the eye distance 10, 12. The optical system 42 comprises a component 66 which is provided to change a position of an exit pupil of the optical system, in particular to generate an eye relief variation. For example, this component 66 could be designed as a movably controllable lens.

Figure 5:
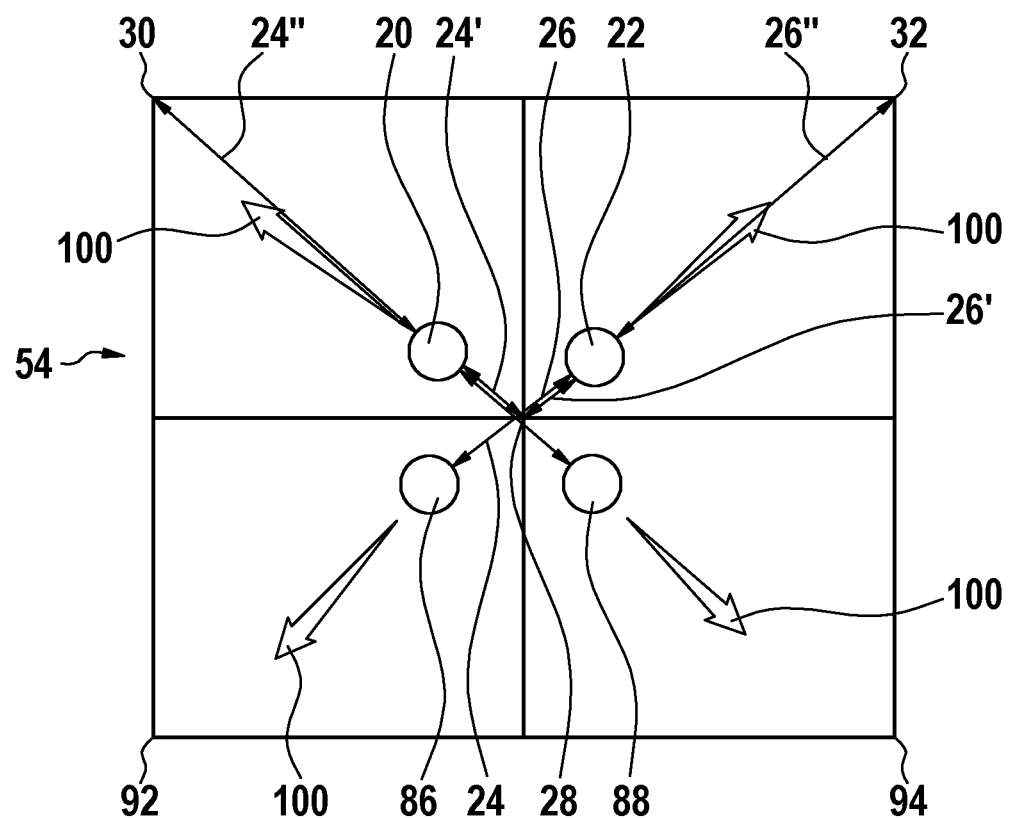
FIG. 5 is an exemplary schematic representation of a reflection signal analyzed in the method, according to an example embodiment of the present invention.

The optical system 42 has a detector 52. The detector 52 is provided for detecting a reflection signal 54 (see FIG. 5) of the scanned laser beam 16, which also has been reproduced by the optical reproduction element 50. The detector 52 is sensitive to infrared light. The detector 52 is integrated into the laser projector 48. The laser projector 48 and the detector 52 are combined in a ViP. The detector 52 communicates detected reflection signals 54 to the evaluation unit 56. The evaluation unit 56 is provided for evaluating the reflection signal 54 detected by the detector 52. The evaluation unit 56 communicates the evaluation results to the eye distance compensation unit 58. The eye distance compensation unit 58 is provided for dynamically controlling the component 66 with the aim of compensating for influences of eye distance variations on a user perception.

Figure 3:
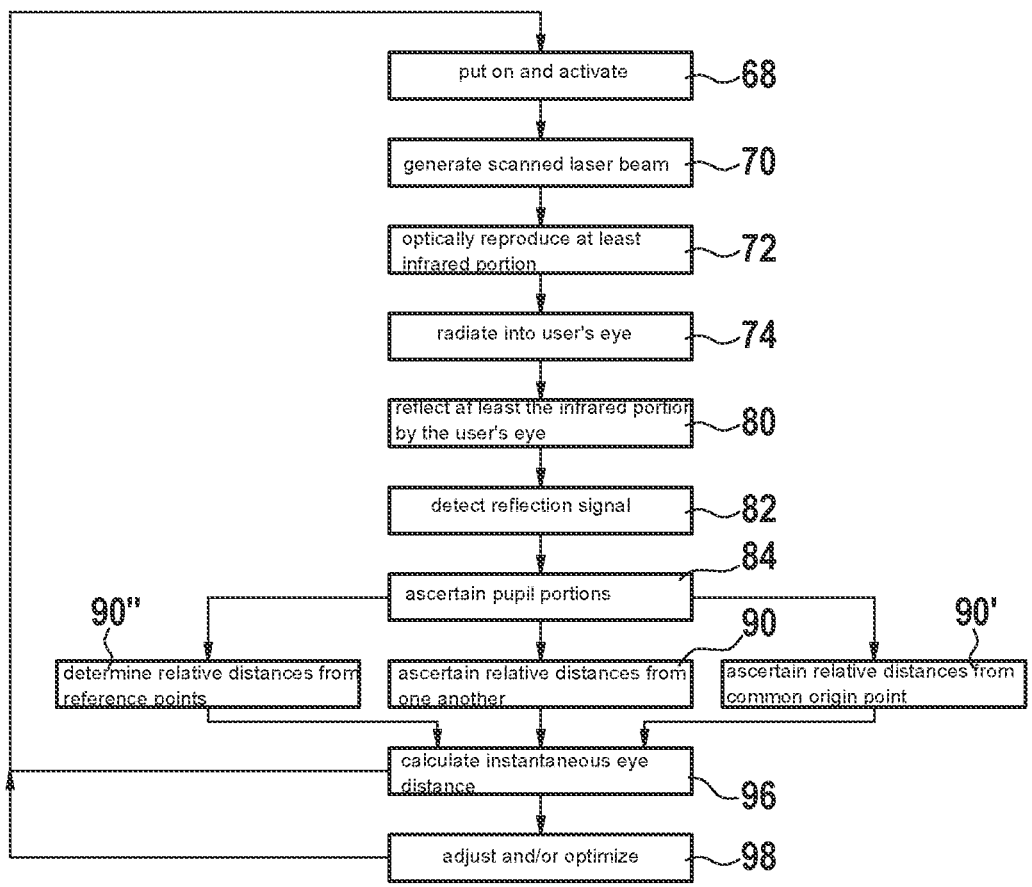
FIG. 3 shows a schematic flow chart of a method for determining and/or correcting changing eye distances in data glasses comprising virtual retinal displays, according to an example embodiment of the present invention.
Figure 4:
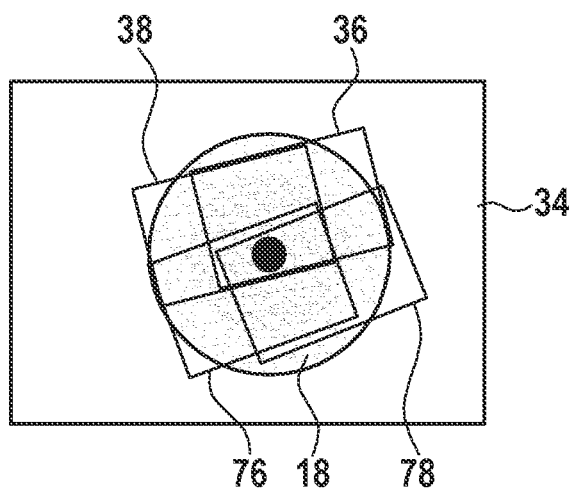
FIG. 4 is a schematic representation of an image plane used in the method, according to an example embodiment of the present invention.

FIG. 3 shows a schematic flow chart of a method for determining eye distances 10, 12 between the user's eye 18 and an optical element of the optical system 42 of the data glasses 14 comprising the virtual retinal display. The method shown in FIG. 3 comprises a method for correcting eye reliefs of the optical system 42 and/or a position of the exit pupil of the optical system 42 on the basis of the ascertained eye distance 10, 12, for optimizing a user perception of the output of the virtual retinal display. In at least one method step 68, the data glasses 14 are put on and activated by the user. In at least one further method step 70, the scanned laser beam 16 is generated by the laser projector 48. In at least one further method step 72, at least the infrared portion of the scanned laser beam 16 is optically reproduced by illumination through the optical reproduction element 50. The scanned laser beam 16 is thereby reproduced by the segmentation lens 46. By means of the optical reproduction of the scanned laser beam 16, four image copies 36, 38, 76, 78 are generated by way of example. In at least one further method step 74, the optically reproduced scanned laser beam 16 is radiated onto the user's eye 18. The four image copies 36, 38, 76, 78 are located in a common image plane 34 (cf. FIG. 4) forming a pupil plane of the user's eye 18. The four image copies 36, 38, 76, 78 are shifted relative to one another in the image plane 34. The four image copies 36, 38, 76, 78 partially overlap. The four image copies 36, 38, 76, 78 overlap in a central region. The four image copies 36, 38, 76, 78 overlap in a region in which the pupil of the user's eye 18 is presumed to be.

In at least one further method step 80, at least the infrared portion of the radiated scanned laser beam 16 is reflected by the user's eye 18. The reflection of the infrared portion of the scanned laser beam 16 by a retina of the user's eye 18 is substantially stronger than the reflection of the infrared portion of the scanned laser beam 16 by parts of the user's eye 18 other than the retina, such as an iris of the user's eye 18. In at least one further method step 82, the reflection signal 54 reflected by the user's eye 18 is detected by means of the detector 52. The detection of the reflected images takes place independently of cameras or detectors which are designed to be separate from the laser projector 48. In at least one further method step 84, pupil positions 20, 22, 86, 88 are ascertained from the detected reflection signal 54 (see FIG. 5). The pupil positions 20, 22, 86, 88 are thereby ascertained from the reflection signal 54 using the bright-pupil effect. In at least one further method step 90, relative distances 24, 26 of the pupil positions 20, 22, 86, 88, ascertained from the reflection signal 54, to one another are determined. In an alternative or additional method step 90', relative distances 24', 26' from a common origin point 28 could also be determined. In a further alternative or additional method step 90", relative distances 24", 26" from reference points 30, 32, 92, 94 could also be determined, wherein each reference point 30, 32, 92, 94 could each be assigned to one of the image copies 36, 38, 76, 78. In at least one further method step 96, the instantaneous eye distance 10 is calculated from the determined relative distances 24, 24', 24", 26, 26', 26" by means of the evaluation unit 56. The eye distance 10 is in this case determined between the user's eye 18 and the last optical element 40, i.e., the HOE embedded in the eyeglass lens 44, of the optical system 42 traversed by the scanned laser beam 16. In method step 96, the eye distance 10, 12 in the optical system 42 of the data glasses 14 is determined.

The calculation of the eye distance 10 takes place recurrently during operation of the data glasses 14. The repetition of the calculation of the eye distance 10 takes place periodically. The repetition of the calculation of the eye distance 10 takes place recurrently at frequencies of more than 1 Hz. If the pair of data glasses 14 now slips, a changed eye distance 12/a need for a change in the exit pupil/eye relief 12 is detected in the repeated method. For example, as a result of the slipping of the data glasses 14, the pupil positions 20, 22, 86, 88 within the individual image copies 36, 38, 76, 78 and thus also within the image plane 34 change. If, for example, a distance between the user's eye 18 and the last optical element 40 of the optical system 42 is reduced, the pupil positions 20, 22, 86, 88 in the image plane 34 move apart. This is shown, by way of example, by the arrows 100 in FIG. 5. On the basis of an evaluation of this change in the pupil positions 20, 22, 86, 88 in the image plane 34, the new (necessary) eye relief 12/new (necessary) position of the exit pupil of the optical system 42 is now determined by the evaluation unit 56. In at least one method step 98, when a change is detected, an output of the virtual retinal display of the data glasses 14 is adjusted and/or optimized by means of the eye distance compensation unit 58 on the basis of the calculated eye distance 12/on the basis of the new eye relief ascertained as necessary for proper operation. A focus of the scanned laser beam 16 (visible portion and/or infrared portion) is thereby adjusted and/or optimized on the basis of the calculated eye relief. For this purpose, for example, the component 66 of the optical system 42 provided for this purpose can be manipulated and/or moved. In method step 98, the eye relief of the optical system 42 and/or the position of the exit pupil of the optical system 42 is corrected on the basis of the ascertained eye distance 10, 12. In method step 98, the eye relief of the optical system 42 and/or the position of the exit pupil of the optical system 42, preferably the focus of the scanned laser beam 16, is manipulated, in particular shifted, (in the direction of a user visual axis) in response to ascertaining a change in distance between the user's eye 18 and the eyeglass lens 44, in such a way that, even after the distance change, the eye relief of the optical system 42 and/or the exit pupil of the optical system 42, preferably the focus of the scanned laser beam 16, overlaps with a pupil position of the user's eye 18, and preferably also with a pupil size of the user's eye 18.

The invention claimed is:

1. A method at least for determining an eye distance between a user's eye and an optical element of an optical system of a pair of data glasses including a virtual retinal display, the method comprising the following steps:

generating a scanned laser beam;
optically reproducing the scanned laser beam;
illuminating the user's eye using the optically reproduced scanned laser beam;
detecting a reflection signal reflected by the user's eye;
ascertaining pupil positions within the detected reflection signal;
determining relative distances of the pupil positions ascertained from the reflection signal: to one another and/or to a common origin point and/or to one or more reference points; and
calculating an instantaneous eye distance from the determined relative distances.

2. The method according to claim 1, wherein, using the optical reproduction of the scanned laser beam, at least two image copies shifted relative to one another in a pupil plane of the user's eye, are generated.

3. The method according to claim 1, wherein the instantaneous eye distance between the user's eye and a last optical element of the optical system, traversed by the scanned laser beam, of the data glasses is determined.

4. The method according to claim 1, wherein the instantaneous eye distance between the user's eye and an eyeglass lens of the data glasses is determined.

5. The method according to claim 1, wherein the scanned laser beam is reproduced by a segmentation lens.

6. The method according to claim 1, wherein the pupil positions are ascertained from the reflection signal using a bright-pupil effect.

7. The method according to claim 1, wherein the calculation of the instantaneous eye distance takes place recurrently at least during operation of the data glasses.

8. The method according to claim 1, wherein the calculation of the instantaneous eye distance takes place periodically at least during operation of the data glasses.

9. The method according to claim 1, wherein an output of the virtual retinal display including at least one focus of at least one visible portion of the scanned laser beam, is adjusted and/or optimized based on the calculated instantaneous eye distance.

10. The method according to claim 1, wherein detection of reflected images takes place independently at least of a camera configured to be separate from a laser projector of the virtual retinal display.

11. An optical system of a pair of data glasses, comprising:
a laser projector configured to generate a scanned laser beam;
an optical reproduction element including a segmentation lens, configured to reproduce the scanned laser beam; and
at least one detector configured to detect a reflection signal of the scanned and reproduced laser beam;
wherein the optical system is configured to determine an eye distance between a user's eye and an optical element of the optical system, the optical system of the pair of data glasses including a virtual retinal display, the optical system configured to:
generate the scanned laser beam using the laser projector;
optically reproduce the scanned laser beam using the optical reproducting element;
illuminate the user's eye using the optically reproduced scanned laser beam;
detect, using the detector, a reflection signal reflected by the user's eye;
ascertain pupil positions within the detected reflection signal;
determine relative distances of the pupil positions ascertained from the reflection signal: to one another and/or to a common origin point and/or to one or more reference points; and
calculate an instantaneous eye distance from the determined relative distances.

12. Data glasses, comprising:
an optical system, including:
a laser projector configured to generate a scanned laser beam;
an optical reproduction element including a segmentation lens, configured to reproduce the scanned laser beam; and
at least one detector configured to detect a reflection signal of the scanned and reproduced laser beam;
wherein the optical system is configured to:
generate the scanned laser beam using the laser projector,
optically reproduce the scanned laser beam using the optical reproducting element,
illuminate a user's eye using the optically reproduced scanned laser beam, and
detect, using the detector, a reflection signal reflected by the user's eye;
an evaluation unit for evaluating the reflection signal detected by the detector, the evaluation unit configured to:
ascertain pupil positions within the detected reflection signal,
determining relative distances of the pupil positions ascertained from the reflection signal: to one another and/or to a common origin point and/or to one or more reference points, and
calculate an instantaneous eye distance from the determined relative distances; and
an eye distance compensation unit configured to dynamically control components of the optical system of the data glasses to compensate for eye distance variations.

* * * * *